United States Patent [19]

Shippen

[11] Patent Number: 4,929,401

[45] Date of Patent: May 29, 1990

[54] METHOD OF MAKING A REUSABLE ADHESIVE PRODUCT

[76] Inventor: Mark A. Shippen, 108 St. Francis Pl., Prattville, Ala. 36067

[21] Appl. No.: 301,968

[22] Filed: Jan. 26, 1989

[51] Int. Cl.$^5$ .................. B29C 35/18; B29C 43/20; B32B 25/08

[52] U.S. Cl. ................... 264/22; 264/236; 264/259; 264/338; 427/207.1

[58] Field of Search .............. 264/22, 236, 259, 338, 264/347; 427/207.1; 428/345, 355

[56] References Cited

U.S. PATENT DOCUMENTS

| | | | |
|---|---|---|---|
| 2,708,289 | 5/1955 | Collings | 264/338 X |
| 3,787,548 | 1/1974 | Harris et al. | 264/259 |
| 3,867,270 | 2/1975 | Malatesta et al. | 427/207.1 X |
| 4,222,973 | 9/1980 | Kasper et al. | 264/22 |
| 4,623,593 | 11/1986 | Baier et al. | 428/355 X |

*Primary Examiner*—Jeffery Thurlow
*Assistant Examiner*—Leo B. Tentoni

[57] ABSTRACT

A method for making removable, reusable adhesive products from soft, solvent-free rubber compositions is disclosed. The rubber compositions are packed together by molding them into thin coatings between a release film and a porous substrate to allow curing. The resultant product has highly desirable bonding and release properties on smooth and porous surfaces. Product applications included are automotive windshield covers, home window insulation curtains, photograph mounting boards, and indoor sign-making backgrounds.

7 Claims, No Drawings

METHOD OF MAKING A REUSABLE ADHESIVE PRODUCT

BACKGROUND AND SUMMARY OF THE INVENTION

The present invention provides a process for making new products which feature a removable, reusable adhesive surface made from soft, solvent-free rubber compositions. Ordinary pressure sensitive adhesives employ solvents to disperse rubber material on a substrate thereby maximizing bonding strength. These adhesives whose primary function is permanent bonding are designed to be disposable, but oftentimes damage their application surface upon removal. This aggressive bonding is undesirable for a variety of applications.

Therefore, a new method for producing adhesive products to overcome these problems is needed. Namely rubber compositions which are essentially solvent-free are packed together by molding them into thin coatings between a release film and a porous substrate to allow curing. The resultant product is a removable, reusable, washable adhesive surface with highly desirable bonding and release properties on a wide range of surfaces. Disposal due to dust and dirt fouling is eliminated. Furthermore, the resultant product can be made so that it is not tacky to the touch or does not bond upon contact with itself, characteristics which allow for easy use and storage.

One important type of solventless silicone rubber composition cures in the presence of water vapor and releases acetic acid. These silicone rubber compositions are marketed by General Electric and Dow Corning as "silicone sealant." Originally developed as a caulking compound for airplane windows, this type of material can be processed into many new products as a removable, reusable adhesive using the present invention.

For example, a 3-5 mil coating may be pressed out between a porous substrate such as posterboard or foam and a release film such as polyethylene or polypropylene. Water vapor is free to diffuse through the porous substrate. When cured, the release film is peeled away from the molded material. A removable, reusable adhesive surface is made for application to glass, many plastics, painted metal and wood, coated paper, paneling and other surfaces.

Another important composition, butyl rubber caulk, has been in use as a window sealer, but has many unappreciated advantages on reusable adhesive products. Butyl rubber caulk cures in the presence of air in about 24 hours for a typical 3-5 mil coating. This composition remains flexible for 10 years and retains desirable adhesive properties using the present invention. Unlike silicone rubber, however, uncured butyl rubber caulk bonds to polyethyelene so that Kraft release liner is the preferred release film. Cross-linked polythylene foam or other foams provide a desirable carrier substrate, so that a small amount of air diffuses through the substrate. After curing, a reusable adhesive surface results which bonds to most smooth surfaces plus painted sheetrock walls, paper and other porous surfaces.

DESCRIPTION OF THE PREFERRED EMBODIMENTS

1. A soft rubber material which is cured by water vapor, loss of small amounts of solvent, ultraviolet irradiation or catalytic polymerization and is room temperature vulcanizing.

2. An essentially porous and/or flexible substrate such as paper, urethane, latex, polyethylene, crosslinked polyethylene, neoprene or rubber foam.

3. A molding release film such as polyethylene, polyproplene, Kraft release liner or other film commonly used as a release film.

4. A device to press or roll a thin coating of the rubber composition between the substrate and the release film. Two rubber coated rollers to prevent slippage during processing are preferred as the pressing device.

EXAMPLE I

Roughen with sandpaper an $8\frac{1}{2}'' \times 11''$ sheet of $\frac{1}{8}''$ thick crosslinked polyethylene foam to remove "the skin." Dispense approximately $\frac{1}{2}$ ounce of General Electric RTV-108 in a line across the foam. Overlay a 4 mil clear polyethylene film on the foam. Starting from behind the line of dispensed silicone rubber, take an ordinary wooden ruler or similar devise and scrape it across the polyethylene overlay. Apply even pressure to obtain a 3-5 mil coating. Then invert the foam to allow maximum air contact with the porous substrate. Cure time is approximately 24 hours. When cured, the polyethylene overlay peels away to expose the cured coating. Notice how well the molded surface adheres to glass.

EXAMPLE II

Dispense approximately $\frac{1}{2}$ ounce of butyl rubber caulk across a $\frac{1}{8}''$ thick $8\frac{1}{2} \times 11''$ sheet of crosslinked polyethylene foam. Overlay a sheet of 10# Kraft release liner. Secure the foam substrate and release film with tape to prevent slippage. Take a piece of angle iron and scrape a 3-5 mil coating. Invert the foam and allow the composition to cure for at least 24 hours. Then peel away the release liner. Notice how well the molded surface adheres to paper, sheetrock walls and other surfaces both smooth and porous.

APPLICATIONS

The advantages of removable, reusable adhesive products in automotive, home insulation, school, office and other applications are evidence of the novelty of this new process. For instance, one application for adhesive coated foam such as mentioned in Example I is for an automotive sunscreen. Currently, cardboard automotive sun shades protect a car's dashboard from the sun and reduce the interior temperature. A noticeable improvement in this application is achieved, since foam is a good insulator and the product adheres snugly to the windshield. Also, the foam may be attached to the exterior windshield during the winter to prevent fouling due to ice and snow.

Another application using the material mentioned in Example I takes advantage of the insulating properties of coated foam for home window covers/curtains. Homeowners could realize substantial energy savings by blocking unused windows with coated polyethylene foam instead of curtains. Winter heat loss through glass windows could be cut by as much as a factor of 20. A removable, reusable adhesive for glass would be essential for this application. An application such as this would also require non-fouling, easily stored material such as the present invention provides.

Another application using coated posterboard similar to Example I enhances graphic art display and photograph mounting. POLAROID pictures are easily mounted and displayed on coated posters. Also, all other photographs may be attached to the poster by sticking small pieces of permanent plastic tape on their back side. Similarly, other paper objects are easily modified with ordinary tape to take advantage of the removable, reusable adhesive. However, most objects will adhere to the foam material of Example II without any special adaptation steps.

In addition, die cut polyester letters, vinyl letters and other plastic letters will adhere to the backgrounds mentioned above. This will allow business and store owners to post reusable announcements and advertising signs. Currently, changeable letter signs employ plastic letters with small metal pins which fit into felt runners. These kits can be expensive and are choking hazards for small children.

Furthermore, changeable letter signs could be utilized by schools. The present invention will allow teachers to post words and pictures easily. Die cut plastic or coated paper letters will be safe for children and allow students to form words before they learn the art of handwriting. The prior art of indoor signmaking will be improved.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be served by Letters of Patent is:

1. A method of preparing a reusable adhesive product comprising
   (a) applying a room-temperature vulcanizing rubber composition onto a substrate; (b) applying a molding release film onto said rubber composition; and
   (c) pressing out a thin film coating of the rubber composition with a mechanical device.

2. The method of claim 1 wherein said rubber composition cures and releases acetic acid.

3. The method of claim 1 wherein said rubber composition is a butyl rubber compound.

4. The method of claim 1 wherein said rubber composition cures by ultraviolet irradiation or electron beam irradiation.

5. The method of claim 1 wherein said rubber composition cures by catalytic polymerization.

6. The method of claim 1 wherein said molding release film is selected from the group consisting of plastic films and kraft release liners.

7. The method of claim 1 wherein said substrate is selected from the group consisting of thermal insulation material, polyethylene foam, cross-linked polyethylene foam, textile fabric, rubber foam and paper.

* * * * *